United States Patent [19]
Lehnert et al.

[11] 3,901,866
[45] Aug. 26, 1975

[54] POLYPENTENAMERS

[75] Inventors: Günther Lehnert; Gottfried Pampus; Dieter Maertens, all of Leverkusen, Germany

[73] Assignee: Bayer Aktiengesellschaft, Germany

[22] Filed: Feb. 28, 1974

[21] Appl. No.: 446,963

Related U.S. Application Data

[62] Division of Ser. No. 316,055, Dec. 18, 1972, abandoned.

[30] Foreign Application Priority Data

Dec. 21, 1971 Germany.............................. 2163395

[52] U.S. Cl. ...... 260/93.1; 252/429 R; 260/33.6 PQ
[51] Int. Cl. ............................................. C08f 1/32
[58] Field of Search .................................... 260/93.1

[56] References Cited
UNITED STATES PATENTS
3,790,543   2/1974   Lehnert et al. .................... 260/93.1

*Primary Examiner*—Stanford M. Levin
*Attorney, Agent, or Firm*—Connolly and Hutz

[57] ABSTRACT

A catalyst system of a. a tungsten or molybdenum salt
b. an organo tin compound
c. a boron halide or its etherate and a process for polymerising cyclopentene to form cis- and trans-polypentenamers with the aid of the catalyst system.

The preferred tungsten or molybdenum salts include halides and oxyhalides. The preferred organotin compounds include those of the formula $$SnX_nR_{4-n}$$

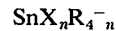

wherein R is alkyl, cycloalkyl, aryl or alkylaryl, X is hydrogen, halogen or alkoxy and n is 0, 1 or 2. The preferred (c) components include those of the formula $BX_3$ and the adducts thereof with an ether, X representing fluorine or chlorine. The catalyst molar ratios of (a):(b) are from 0.1 to 0:10 and the preferred molar ratios of (a):(c) are from 1:0.01 to 1:10.

6 Claims, No Drawings

POLYPENTENAMERS

CROSS REFERENCE TO RELATED APPLICATION

This application is a division of application Ser. No. 316,055 filed Dec. 18, 1972, and now abandoned.

This invention relates to polypentenamers in which the double bonds are predominatly in the cis- or trans-configuration and to a catalyst system for preparing such cis- or trans-polypentenamers from cyclopentene.

The catalyst system according to the invention consists of a. a tungsten or molybdenum salt,
b. an organo tin compound and
c. a boron halide or its etherate.

Particularly suitable tungsten and molybdenum salts are the halides, oxyhalides and mixtures thereof in which the halogen is fluorine, chlorine, bromine or iodine. The following are examples of suitable compounds:

$WF_6$, $WCl_6$, $WCl_5$, $WBr_5$, $WCl_4$, $WOF_4$, $WOCl_4$, $WOBr_4$, $MoCl_5$, $MoF_5$, $MoBr_5$, $MoI_5$, $MoCl_4$, $MoOCl_3$, $MoOF_3$.

$WCl_6$, $WCl_5$ and $WOCl_4$, $MoCl_5$ $MoCl_4$, and $MoOCl_3$ and mixtures thereof are particularly preferred.

The preferred organo tin compounds (Component B) have the general formula $Sn\ X_n\ R_{4-n}$ in which R represents an alkyl group (preferably containing 1 – 20 carbon atoms), a cycloalkyl group (preferably containing 3 – 8 carbon atoms), an aryl group (preferably containing 6 – 10 carbon atoms) or an alkaryl group (the alkyl preferably containing 1 – 6 carbon atoms and the aryl preferably 6 – 10 carbon atoms), X represents halogen (F, CL, Br, I), hydrogen or an alkoxy group (preferably containing 1 – 20 carbon atoms) and n denotes 0, 1, 2.

The following are examples of suitable organo tin compounds: tetramethyl tin, dimethyldiethyl tin, tetraethyl tin, diethyldibutyl tin, tetrabutyl tin, tetraoctyl tin, tetracyclohexyl tin, tetrabenzl tin, tetraphenyl tin, triethyl tin fluoride, triethyl tin chloride, triethyl tin, bromide, triethyl tin iodide, diethyl tin dichloride, diethyl tin dibromide, diethyl tin diiodide, triethyl stannane and diethylstannane.

Organo tin compounds of the formula $SnR_4$ in which R has the meanings indicated above are preferred.

Tetraethyl tin, tetrabutyl tin and tetraoctyl tin are particularly preferred.

The compounds used as component c) of the catalyst system according to the invention are boron halides $BX_3$ (X = F or Cl) or their addition products with ether of the formula $R^1 — O — R^2$ in which $R^1$ and $R^2$ represent alkyl groups (preferably containing 1 – 12 carbon atoms) cycloalkyl (preferably containing 5 – 8 carbon atoms) aryl (preferably containing 6 – 10 carbon atoms) or alkaryl (in which the alkyl portion preferably contains 1-6 carbon atoms and the aryl portion 6 – 10 carbon atoms) and $R^1$ and $R^2$ may be joined together to form a ring. In addition $R^1$ and $R^2$ may be partly or completely halogenated (e.g. chlorinated).

The following are examples of suitable boron halides or boron halide adducts: $BF_3$, $BCl_3$ $BF_3$ . dimethyl ether, $BF_3$ . diethyl ether, $BF_3$ . dibutylether, $BF_3$ . dichlorodibutyl ether, $BF_3$ . methyl ethyl ether, $BF_3$ . ethylbutyl ether, $BCl_3$ . diethylether, $BCl_3$ . dichlorodibutylether, $BCl_3$ . methyl ethyl ether, $BF_3$ . dicyclohexyl ether, $BCl_3$ . dicyclohexyl ether, $BF_3$ . diphenylether, $BCl_3$ . diphenylether $BF_3$ . anisole, $BCl_3$ . anisole, $BF_3$ . phenetole, $BCl_3$ . phenetole, $BF_3$ . dibenzylether, $BCl_3$ . dibenzylether, $BF_3$ . tetrahydrofuran $BCl_3$ . tetrahydrofuran 2 $BF_3$ . dioxane and 2 $BCl_3$ . dioxane.

Adducts of $BX_3$ (X = F or Cl) with other compounds which contain free electon pairs may in principle also be used if they are capable of completing the electron sextet of boron halide to form the electron octet. For the invention, however, adducts of $BX_5$ (X = F or Cl) with ether are preferred. The catalyst system according to the invention may be used for the polymerisation of cyclopentene in solution or for the solvent-free polymerisation of cyclopentene.

The catalyst may be prepared by reacting components a) to c) together in an inert organic solvent. It is preferred to start with a solution of the tungsten or molybdenum compound (a) and then first add the boron compound (c), preferably as a solution in an inert organic solvent, and finally to add the organic tin compound (b). A solution containing the prepared catalyst is thereby obtained.

If desired, however, the catalyst may be prepared in the presence of the monomer. In that case, a solution of the tungsten or molybdenum compound (a) in a solvent which is suitable for polymerisation is first prepared to which the boron compound (b) is then added, followed by the monomer. The reaction mixture is then adjusted to the polymerisation temperature and polymerisation is initiated by the addition of the organo tin compound (c).

Inert organic solvents which are suitable for preparation of the catalyst and for polymerisation are aliphatic and cycloaliphatic hydrocarbons containing e.g. 5 to 12 carbon atoms, such as pentane, heptane, cyclohexane or commercial petroleum hydrocarbons fractions with boiling points between 35° and 200°C, aromatic hydrocarbons such as benzene or toluene and aliphatic or aromatic halogenated hydrocarbons such as chlorobenzene or mixtures of the above mentioned solvents.

The concentration of the monomers in the reaction mixtures is from 5 to 50 % by weight, preferably 15 to 30 % by weight.

The quantity of tungsten or molybdenum compound (a) used per 100 g of monomer is generally 0.01 to 10 mmol, preferably 0.2 to 1 mmol.

The molar ratio of tungsten or molybdenum to tin, i.e. the molar ratio of the catalyst constituents a : b is generally from 1 : 0,1 to 1 : 10, preferably from 1 : 0.5 to 1 : 3. The molar ratio of tungsten or molybdenum to boron, i.e. the ratio of constituents a : c, is generally from 1 : 0.01 to 1 : 10, preferably from 1 : 0.05 to 1 : 2.

The process is preferably carried out under a protective gas atmosphere, for example of nitrogen or argon.

The pressure employed is immaterial when using the catalyst system of the invention and can be adapted to the given technical conditions but the reaction mixture should remain liquid.

Polymerisation of cyclopentene using the catalyst system according to the invention yields polypentenamers in which more than 80% and often more than 90% of the double bonds have the cis-configuration (determined from IR spectrum) if catalyst component a) is a tungsten salt and polymerisation is carried out at −100°C to −10°C, preferably −50°C to −25°C. The molecular weights of these polypentenamers can be adjusted to vary from several thousands to several millions by the addition of known molecular weight regulators (see P. Günther et al., Angew. Makromol. Chem. 14, 87 – 109 (1970) without any loss in the cis-double bond content or in the yield.

The catalyst system presented here therefore provides the possibility of a simple process for the polymerisation of cyclopentene to polypentenamers which have cis-contents of over 80% and in particular over 90%. In contrast to the process according to DAS No. 1,299,868, polymerisation with the catalyst system according to the invention may be continued to give high yields even in solvents and without gel formation. If cis-polypentenamers with sufficiently high molecular weights for technical purposes were obtained by the polymerisation processes previously known, this necessitates using very large quantities of catalyst. If conventional molecular weight regulators were used high molecular weights were obtained only at the expense of considerable decrease in cis-content and yield. Unexpectedly, the catalyst system of the invention provides the possibility of adjusting the molecular weights to values $\leqq$ 500.000 by the addition of known molecular weight regulators and particularly of 1-olefins without decrease in cis-content and with only small quantities of catalyst.

The polymers obtained can be cross-linked with known vulcanising agents and processed into the usual rubber products which retain their elasticity down to temperatures of $< -80°C$.

If a tungsten or molybdenum salt is used as catalyst component a) and polymerisation is carried out at $-10°C$ to $+50°C$, preferably $0°C$ to $30°C$, the polypentenamers obtained have a predominantly trans-configuration, in most cases 75% or more of the double bonds having the trans-configuration.

The following examples are all carried out using dry apparatus and reagents and under a protective gas atmosphere of nitrogen.

EXAMPLE 1

Five hundred and twenty g of toluene, 31 ml of a 0.025 molar solution of $WCl_6$ in toluene; and 0.065 mmol of $BF_3$ . diethyl ether are cooled to $-35°C$ in a stirred vessel with the exclusion of air and water.

150 g of cyclopentene, 7 g of butene-(1) (for molecular weight adjustment) and 1.55 ml of a molar solution of tetraethyl tin in toluene are added. The solution becomes viscous within 5 minutes. Polymerisation is carried out for 4 hours at $-35$ to $-30°C$.

Polymerisation is then stopped by the addition of a mixture of 1.5 g of tri-n-butylamine, 0.5 g of 2,2'-dihydroxy-3,3'-di-tert. butyl-5,5'-dimethyl-diphenylmethane, 3 g of ethanol and 10 ml of toluene. The polymer is precipitated by introducing the polymer solution into 2 l of ethanol and is then expressed and dried under vacuum at 50°C.
Yield: 48.5% of the theory.
cis-double bond content: 92.5% $[\eta] = 2.1$ at 25°C in toluene

EXAMPLE 2

Five hundred and twenty g of toluene, 0.065 mmol of $BF_3$ . diethylether and 0.775 mmol of $WCl_6$ (as a 0.025 molar solution in toluene) are cooled to $-35°C$ as described in Example 1. 1.55 ml of a molar solution of tetraethyl tin in toluene is then added and the catalyst is stirred at $-35°C$ for 15 minutes. A mixture of 1.05 g of butene-(1) and 150 g of cyclopentene is then added and polymerisation is carried out for 4 hours at $-35°C$ to $-30°C$.

The polymer solution is then worked up as in Example 1.
Yield: 58% of the theory
cis-double bond content : 97 . 1% $[\eta] = 7.0$ at 25°C in toluene.

EXAMPLE 3

Polymerisation is carried out as described in Example 2 but using 2.1 g of butene-(1)
Yield: 54% of the theory
cis-double bond content: 95.1 $[\eta] = 3.3$ at 25°C in toluene.

EXAMPLE 4

Polymerisation is carried out as described in Example 1 but using 2.1 g of butene-(1) and tetrabutyl tin instead of tetraethyl tin.
Yield: 47% of the theory
cis-double bond content: 91.9% $[\eta] = 5.3$ at 25°C in toluene.

EXAMPLE 5

Polymerisation is carried out as in Example 2 but using 2.1 g of butene-(1) instead of tetrabutyl tin.
Yield: 42.5% of the theory.
cis-double bond content: 94.7% $[\eta] = 3.8$ at 25°C in toluene

EXAMPLE 6

Polymerisation is carried out as in Example 1 but using 0.1 mmol of an adduct of $BF_3$ with anisole and 3.5 g of butene-(1) instead of $BF_3$ . diethylether.
Yield: 50% of the theory
cis-double bond content : 94.3 $[\eta] = 2.89$ at 25°C in toluene

EXAMPLE 7

Polymerisation is carried out as in Example 1 except that no butene-(1) is added
Yield: 51.7% of the theory
cis-double bond content 91.8% $[\eta] = 12.1$ at 25°C in toluene.

EXAMPLE 8

Polymerisation is carried out as in Example 2 but without butene-(1)
Yield: 40.7%
cis-double bond content: 88.7% $[\eta] = 12.0$ at 25°C in toluene

EXAMPLE 9

Polymerisation is carried out as in Example 1 but using 0..1 mmol of an adduct of $BF_3$ with tetrahydrofuran and 3.5 g of butene-(1)
Yield: 58.2%
cis-double bond content: 95.4% $[\eta] = 4.39$ at 25°C in toluene

EXAMPLE 10

Eight hundred g of toluene, 200 g of cyclopentene and 30 mg of butene-(1) are introduced into a stirred vessel with the exclusion of air and water. A mixture of 1 mmol of $MoCl_5$ and 0.15 mmol of $BF_3.O(C_2H_5)_2$ is added under an atmosphere of nitrogen. The system is activated by addition of 1 mmol of Sn(C$_2$H$_5$)$_4$ at 20°C Polymerisation is carried out for 3 hours at 20°C. The polymer solution is worked up as in Example 1.
Yield: 61% of the theory
trans-double bond content: 81.4% [$\eta$] = 2.73 at 25°C in toluene

EXAMPLE 11

Polymerisation is carried out as in Example 10 but using BF$_3$.anisole instead of BF$_3$. O(C$_2$H$_5$)$_4$.
Yield: 54% of the theory
trans-double bond content: 78.7% [$\eta$] = 2.97 at 25°C in toluene.

EXAMPLE 12

Polymerisation is carried out as in Example 10 but adding only a mixture of 0.6 mmol of MoCl$_5$ and 0.08 mmol of BF$_3$ . O(C$_2$H$_5$)$_2$. The system is activated by adding 0.9 mmol of Sn(C$_2$H$_5$)$_4$.
Yield: 50% of the theory. trans-double bond content: 78.4% [$\eta$] = 3.10 at 25°C in toluene

EXAMPLE 13

Polymerisation is carried out as in Example 10 except that 80 mg of butene-(1) are added to the cyclopentene and the quantity of BF$_3$ . O(C$_2$H$_5$)$_2$ is increased to 0.25 mmol.
Yields: 72.2% of the theory
trans-double bond content: 80.7% [$\eta$] = 2.44 at 25°C in toluene.

EXAMPLE 14

Polymerisation is carried out as in Example 10 except that 80 mg of butene-(1) are added to the cyclopentene. The proportion of BF$_3$.O(C$_2$H$_5$)$_2$ is 0.1 mmol.
Yield: 64.7% of the theory
trans-double bond content: 81.2% [$\eta$] =2.35 at 25°C in toluene

EXAMPLE 15

A mixture of 1 mmol of MoCl$_5$, 0.15 mmol of BF$_3$ . O(C$_2$H$_5$)$_2$ and 1 mmol of Sn (C$_2$H$_5$)$_4$ in 800 g of toluene is stirred for one hour at 0°C in a stirred vessel with the exclusion of air and water. After the addition of 200 g of cyclopentene and 60 mg of butene-(1) polymerisation is carried out for 3 hours at 0°C. The polymer solution is worked up as in Example 1.
Yield: 58% of the theory.
trans-double bond content: 76% [$\eta$] = 3.47 at 25°C in toluene.

EXAMPLE 16

Five hundred and twenty g of toluene, 150 g of cyclopentene, 350 mg of butene-1 24 ml of a 0.025 molar solution of WCl$_6$ in toluene and 1.2 mmol of BF$_3$ . diethylether are heated to +30°C in a stirred vessel for 15 minutes with the exclusion of air and water The system is activated by adding 0.6 mmol of tetrabutly tin and polymerised at 30°C for 4 hours. The polymer solution is worked up as in Example 1
Yield: 49.9% of the theory.
trans-double bond content 80.3 % [$\eta$] = 2.0 at 25°C in toluene.

EXAMPLE 17

Polymerisation is carried out as in Example 16 but using 0.9 mmol of tetraethyl tin instead of tetrabutyl tin, and polymerisation continued for 3.5 hours at +20°C.
Yield: 53.4% of the theory
trans-double bond content: 77.4% [$\eta$] = 2.7 at 25°C in toluene

We claim:
1. A process for preparing polypentenamers in which at least 80% of the double bonds have the cis-configuration which comprises polymerizing cyclopentene at a temperature of −100 to −10°C. in the presence of a catalyst comprising
   a. at least one halide or oxyhalide of tungsten,
   b. an organo tin compound of the formula

$$SnX_nR_{4-n}$$

wherein R is alkyl, cycloalkyl, aryl or alkaryl, X is hydrogen, halogen or alkoxy and $n$ is 0, 1 or 2 and
   c. a boron halide or its etherate, the molar ratio of (a):(b) being from 1:0.1 to 1:10 and the molar ratio of (a):(c) being from 1:0.01 to 1:10.
2. The process of claim 1 wherein (c) is BX$_3$ or its adduct with an ether, X being fluorine or chlorine.
3. The process of claim 1 wherein said polymerization is carried out in an inert organic solvent.
4. A process for preparing polypentenamers in which at least 75% of the double bonds have the trans-configuration which comprises polymerizing cyclopentene at a temperature of −10° to 50°C. in the presence of a catalyst comprising
   a. at least one halide, interhalide or oxyhalide of tungsten or molybdenum,
   b. an organo tin compound of the formula $$SnX_nR_{4-n}$$

wherein R is alkyl, cycloalkyl, aryl or alkaryl, X is hydrogen, halogen or alkoxy and $n$ is 0, 1 or 2 and
   c. a boron halide or its etherate, the molar ratio of (a):(b) being from 1:0.1 to 1:10 and the molar ratio of (a):(c) being from 1:0.01 to 1:10.
5. The process of claim 4 wherein (c) is BX$_3$ or its adduct with an ether, X being fluorine or chlorine.
6. The process of claim 4 wherein said polymerization is carried out in an inert organic solvent.

* * * * *